(12) United States Patent
Ferris et al.

(10) Patent No.: US 11,584,833 B2
(45) Date of Patent: *Feb. 21, 2023

(54) BIODEGRADABLE TEXTILES, MASTERBATCHES, AND METHOD OF MAKING BIODEGRADABLE FIBERS

(71) Applicant: Intrinsic Advanced Materials, LLC, Gastonia, NC (US)

(72) Inventors: Andrea Ferris, Hayward, CA (US); Alan McIntosh, Hayward, CA (US); Sudeep Motupalli Rao, Santa Rosa, CA (US); Robert A. Usher, Charlotte, NC (US)

(73) Assignee: INTRINSIC ADVANCED MATERIALS, LLC, Gastonia, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/813,883

(22) Filed: Mar. 10, 2020

(65) Prior Publication Data

US 2020/0247961 A1    Aug. 6, 2020

Related U.S. Application Data

(63) Continuation of application No. 16/354,728, filed on Mar. 15, 2019, now Pat. No. 10,683,399.

(60) Provisional application No. 62/690,227, filed on Jun. 26, 2018, provisional application No. 62/690,243, filed on Jun. 26, 2018.

(51) Int. Cl.
| | |
|---|---|
| *C08J 3/22* | (2006.01) |
| *D04H 1/435* | (2012.01) |
| *D04H 1/4291* | (2012.01) |
| *D04H 1/56* | (2006.01) |
| *D04H 1/4334* | (2012.01) |
| *D01F 1/10* | (2006.01) |
| *C08K 3/26* | (2006.01) |
| *D04H 3/16* | (2006.01) |
| *D04H 1/4382* | (2012.01) |

(52) U.S. Cl.
CPC .......... *C08J 3/226* (2013.01); *C08K 3/26* (2013.01); *D01F 1/10* (2013.01); *D04H 1/4291* (2013.01); *D04H 1/435* (2013.01); *D04H 1/4334* (2013.01); *D04H 1/43835* (2020.05); *D04H 1/43838* (2020.05); *D04H 1/56* (2013.01); *D04H 3/16* (2013.01); *C08J 2367/04* (2013.01); *C08J 2467/00* (2013.01); *C08J 2477/00* (2013.01); *C08K 2003/265* (2013.01)

(58) Field of Classification Search
CPC ....... C08J 3/226; C08J 3/26; C08K 2003/265; D01F 1/10; D04H 1/4291; D04H 1/4334; D04H 1/56; D04H 3/16
See application file for complete search history.

(56) References Cited

U.S. PATENT DOCUMENTS

| | | | |
|---|---|---|---|
| 5,364,694 | A | 11/1994 | Okada |
| 5,688,582 | A | 11/1997 | Nagaoka |
| 6,506,873 | B1 | 1/2003 | Ryan |
| 8,841,386 | B2 | 9/2014 | He |
| 10,683,399 | B2 * | 6/2020 | Ferris ............... A41D 31/06 |
| 2007/0219323 | A1 | 9/2007 | Bruning |
| 2010/0323575 | A1 | 12/2010 | He |
| 2012/0088424 | A1 | 4/2012 | Eric |
| 2012/0202928 | A1 | 8/2012 | Loos |
| 2015/0147929 | A1 | 5/2015 | Krishnaswamy |
| 2015/0322604 | A1 | 11/2015 | Brunner |
| 2016/0053111 | A1 | 2/2016 | Krishnaswamy |
| 2017/0204536 | A1 | 7/2017 | Brunner |

FOREIGN PATENT DOCUMENTS

| | | |
|---|---|---|
| AU | 2005339151 B2 | 9/2011 |
| CN | 1129638 | 8/1996 |
| CN | 1204654 A | 1/1999 |
| CN | 1267681 | 9/2000 |
| CN | 1683446 A | 10/2005 |
| CN | 101128535 A | 2/2008 |
| CN | 101508791 A | 8/2009 |
| CN | 101952491 A | 1/2011 |
| CN | 103911681 A | 7/2014 |
| CN | 104955995 A | 9/2015 |
| CN | 105802008 A | 7/2016 |
| CN | 106661767 A | 5/2017 |
| CN | 107828232 | 3/2018 |

(Continued)

OTHER PUBLICATIONS

European Patent Office; Extended European Search Report for European Patent Application No. 19825317.1 dated Feb. 11, 2022, 6 Pages.
European Patent Office; Extended European Search Report for European Patent Application No. 19825319.7 dated Mar. 10, 2022, 6 Pages.
European Patent Office; Extended European Search Report for European U.S. Appl. No. 19/826,633 0 dated Mar. 10, 2022, 6 Pages.
Sutyagin, V.M., et al.; "Chemistry and Physics of Polymers: a Textbook," Tomsk; TPU Publishing House, 2003; p. 142.
Russian Patent Office; Office Action for Russian Patent Application No. 2020141420/04 dated Dec. 29, 2021, 11 Pages.

(Continued)

*Primary Examiner* — Edward J Cain
(74) *Attorney, Agent, or Firm* — Moore & Van Allen PLLC; Lauren E. Burrow; Rebeca E. Harasimowicz

(57) ABSTRACT

A masterbatch is disclosed, along with associated methods, and biodegradable filaments, fibers, yarns and fabrics. The masterbatch includes 0.2 to 5 mass % $CaCO_3$, an aliphatic polyester with a repeat unit having from two to six carbons in the chain between ester groups, with the proviso that the 2 to 6 carbons in the chain do not include side chain carbons, and a carrier polymer selected from the group consisting of PET, nylon, other thermoplastic polymers, and combinations thereof.

26 Claims, 7 Drawing Sheets

(56) References Cited

FOREIGN PATENT DOCUMENTS

| | | | |
|---|---|---|---|
| CN | 108047666 A | 5/2018 |
| EP | 0057415 A2 | 8/1982 |
| EP | 0731198 A2 | 9/1996 |
| EP | 2749679 A1 | 7/2014 |
| EP | 2963162 A1 | 1/2016 |
| EP | 3164533 A1 | 5/2017 |
| JP | 2001011749 A | 1/2001 |
| JP | 2002173864 A | 6/2002 |
| JP | 2003049323 A | 2/2003 |
| JP | 2008095212 A | 4/2008 |
| KR | 20110062933 A | 6/2011 |
| KR | 101149833 | 5/2012 |
| KR | 20170104675 A | 9/2017 |
| SE | 540458 C2 | 9/2018 |
| WO | 2016000968 A1 | 1/2016 |
| WO | 2016079724 A2 | 5/2016 |
| WO | 2016198652 A1 | 12/2016 |

OTHER PUBLICATIONS

Korean Patent Office; Office Action for Korean Patent Application No. 10-2021-7002272 dated Oct. 31, 2022, 7 pages.
Indian Patent Office; Office Action for Indian Patent Application No. 202127003417 dated Jul. 20, 2022, 6 Pages.
Indian Patent Office; Office Action for Indian Patent Application No. 202127003419 dated Jul. 20, 2022, 6 Pages.
Indian Patent Office; Office Action for Indian Patent Application No. 202127003418 dated Aug. 5, 2022, 6 Pages.
Chinese Patent Office; Office Action for Chinese Patent Application No. 201980042513.X dated Sep. 22, 2022, 6 Pages.
Chinese Patent Office; Office Action for Chinese Patent Application No. 201980042515.9 dated Sep. 28, 2022, 5 Pages.
Columbian Patent Office; Office Action for Colombian Patent Application No. NC2020/0016199 dated Aug. 19, 2022, 13 pages.
Columbian Patent Office; Office Action for Colombian Patent Application No. NC2020/0016197 dated Sep. 26, 2022, 15 pages.
Columbian Patent Office; Office Action for Colombian Patent Application No. NC2020/0016200 dated Sep. 26, 2022, 15 pages.

\* cited by examiner 50 um

Electron microscopic imaging of fibers subjected to bacterial decomposition

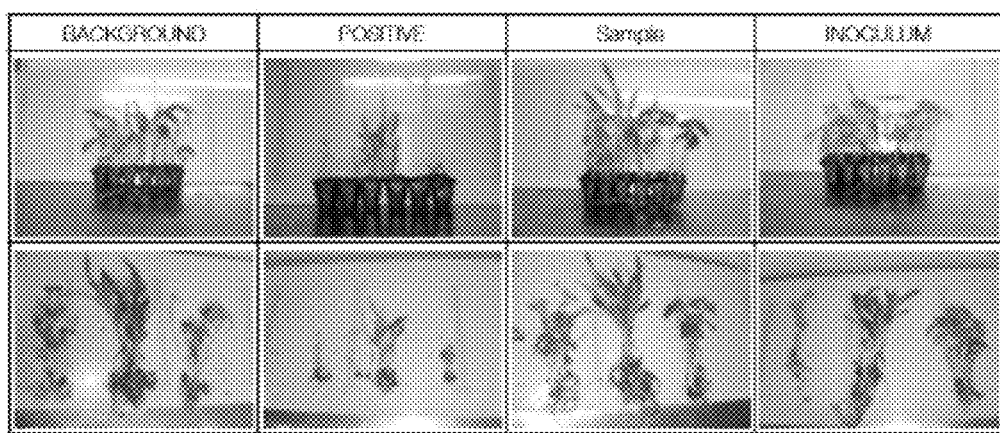
Figure 7 Plant Toxicity Testing

BIODEGRADABLE TEXTILES, MASTERBATCHES, AND METHOD OF MAKING BIODEGRADABLE FIBERS

The present invention relates to polymer compositions suitable for textiles and that are also biodegradable in a reasonable helpfully short time span as compared to most common polymers.

BACKGROUND

Textiles are fundamental to human culture and have been made and used by humans for thousands of years. The earliest textiles were—and continue to be—woven from natural fibers such as flax, wool, silk, and cotton. More recently, textile fibers, yarns and fabrics also have been industrially produced from polymers, such as polyester, nylon olefins, other thermoplastic polymers, and combinations thereof. Many modern polymers can be made into an almost endless variety of shapes and products that are attractive, durable, and water-resistant. In many cases these synthetic fibers or yarns (depending upon the desired technique and end product) can be blended with natural fibers to obtain end products with desired features of both natural and synthetic materials.

Although durability and water-resistance are desirable, these same properties can lead to secondary environmental problems. Textiles produced from polymeric fibers do not naturally biodegrade in the same manner as natural fibers such as cotton and wool, and can remain in landfills and water (e.g., lakes, oceans) for hundreds of years or more. According to the United States Environmental Protection Agency, almost 44 million pounds of synthetic (polymeric) textiles go to landfills on a daily basis. In addition, a large portion of the microfibers that are released from garments during the laundry wash cycle get caught in waste water treatment plant sludge. The sludge is eventually turned out as biosolids that are sent to landfill or used as fertilizer These polymeric microfibers then accumulate in soil or other ground environments, and may even become mobile, eventually making their way from terrestrial to aquatic environments. According to some estimates, around half a million tons of plastic microfibers resulting from the washing of textiles are estimated to be released into the ocean on an annual basis. Certain high surface area microfibers can absorb large toxin loads and resemble microscopic plankton, thereby ending up bio accumulated in the food chain by several orders of magnitude. In turn, because humans typically consume top predator species, such microfiber pollution may negatively affect human health.

As additional issues, items such as carpet and upholstery (both residential and commercial) are bulky relative to garments, and typically incorporate larger, bulkier yarns, and thus can occupy significant landfill space.

In the non-woven context, the now ubiquitous "wipes" of all types (typically a non-woven sheet or several ply sheet) likewise take up significant space, and can also have a tendency, even when considered "flushable," to clog municipal sewage systems, particularly given the increasing use of low volume, low flow commodes.

In view of these environmental problems, the creation of biodegradable polymers has been the subject of intense academic and industrial interest. These include the following examples, which are representative rather than comprehensive.

Shah et al. in "Microbial degradation of aliphatic and aliphatic-aromatic co-polyesters," Appl. Microbiol. Biotechnol (2014) 98:3437-3447 has reviewed the literature concerning the degradation of the polyesters and has remarked that "most of the biodegradable plastics are polyesters with potentially hydrolysable ester bonds, and these are susceptible to hydrolysis by depolymerases;" and that the aliphatic polyesters degrade easily as compared to aromatic esters due to their flexible polymer chain. Some polyesters, such as PET, are not biodegradable as that term is used in the invention described herein.

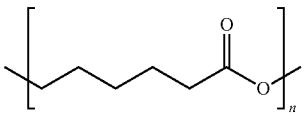

Numerous patents have described biodegradable polymeric compositions. For example, in WO 2016/079724 to Rhodia Poliamida polyamide compositions are modified in order to produce biodegradable polyamide fibers. In this patent, the biodegradation rate is measured according to the ASTM D5511 testing standard. On pages 8-9, prior art approaches to biodegradation are discussed including: photo-degradation, prodegradant additives such as transition metal salts, and biodegradable polymers that rapidly degrade leaving behind a porous structure having a high interfacial area and low structural strength; these biodegradable polymers 10 are listed as including starch-based polymers, polylactic acid, polycaprolactone, polybutylene succinate, polybutylene terephthalate-coadipate, and several others; however, the patent application states that "unfortunately, higher amounts are required to render the polymer biodegradable, compatibilizing and plasticizing additives are also needed." As exemplary biodegradation agents, this patent refers to US Published Patent Application No. 2008/0103232 15 to Lake et al. The biodegradation agent is advantageously a masterbatch including at least six additives: (1) chemo attractant or chemo taxis compound; (2) glutaric acid; (3) carboxylic acid with a chain length of from 5-18 carbons; (4) biodegradable polymer; (5) carrier resin; and (6) swelling agent. The inventive example made polyamide fiber by melt-spinning using 2% of masterbatch of the commercially available biodegradation agent Eco-One®. The resulting fibers were tested via the ASTM D5511 standard and were found to degrade 13.9% or 15.5% after 300 days. The fibers without biodegradation agent degraded 2.2 and 2.3% under the same ASTM D5511 testing.

LaPray et al. in US 2018/0100060 produce biodegradable articles such as a film, bag, bottle, cap, sheet, box or other container, plate or the like that are made from a blend of a polymer with a carbohydrate-based polymer. The biodegradability is tested according to established standards such as ASTM D-5511 and ASTM D-6691 (simulated marine conditions).

Tokiwa et al. describe biodegradable resin compositions comprising a biodegradable resin and a mannan (polysaccharide) digestion product. Tokiwa et al. list biodegradable mannan digestion products include various mannooligosaccharrides.

Bastioli et al. in U.S. Pat. No. 30 8,466,237 describes a biodegradable aliphatic-aromatic copolyester made from 51 to 37% of an aliphatic acid comprising at least 50% brassylic acid (1,11-undecanedicarboxylic acid) and 49 to 63% of an aromatic carboxylic acid. The biodegradable polymer can be additionally modified by the addition of starch or polybutylene succinate and copolymerization with lactic acid or polycaprolactone.

Lake et al. in U.S. Pat. No. 9,382,416 describe a biodegradable additive for polymeric material comprising a chemo attractant compound, a glutaric acid, a 5 carboxylic acid, and a swelling agent. Furanone compounds are discussed as attractants for bacteria.

Wnuk et al. in U.S. Pat. No. 5,939,467 describes a biodegradable polyhydroxyalkanoate polymer containing a second biodegradable polymer such as polycaprolactone with examples of cast and blown films A variety of biodegradable formulations are known, typically outside the field of textiles that do not address the issue of launderability, some of which may utilize calcium carbonate. For example, Yoshikawa et al. in US Published Patent Application No. 2013/0288322, Jeong et al. in WO/2005/017015, Tashiro et al. in U.S. Pat. No. 9,617,462, and Whitehouse, in US Patent Application 2007/0259584.

Despite these intensive efforts, there remains a need for novel methods and materials that provide synthetic textiles that are durable and water-resistant but that degrade in waste water treatment anaerobic digesters, landfill conditions and marine environments. Thus, it would be beneficial to create synthetic textiles that maintain their desirable properties but that also degrade more rapidly than conventional synthetic textile materials during waste water treatment, in anaerobic digesters, in landfill conditions, and in marine environments.

SUMMARY OF THE INVENTION

In one aspect, the invention provides a masterbatch, comprising: 0.2 to 5 mass % $CaCO_3$; an aliphatic polyester comprising a repeat unit having from two to six carbons in the chain between ester groups, wherein the 2 to 6 carbon chain repeat unit does not include side chain carbons; and a carrier polymer comprising PET, nylon, olefins, other thermoplastic polymers, and combinations thereof. The 2 to 6 carbons in chain repeat unit do not include carbons in the ester (COOR) moiety and if side-chain carbons are present there could be more than 6 carbons (plus ester carbon) in a repeating group.

In some preferred embodiments of any of the inventive aspects, the aliphatic polyester comprises a repeat unit having from three to six carbons, or from 2 to 4 carbons, in the chain between ester groups. In particularly preferred embodiments the aliphatic polyester comprises polycaprolactone. In some preferred embodiments, the masterbatch further comprises polybutylene succinate (PBS), polybutylene succinate adipate (PBSA), polylactic acid (PLA), polyethersulfone (PES), polyhydroxybutyrate (PHB), poly (3-hydroxybutyrate-co-3-hydroxyvalerate) (PHBV), polybutylene adipate terephthalate (PBAT), polybutylene succinate adipate (PBSA), poly(butylenes succinate-co-terephthalate) (PBST), poly(butylene succinate/terephthalatehsophthalate)-co-(lactate) PBSTIL, and combinations thereof.

Preferably, the masterbatch (and the textile) comprises essentially no saccharides.

In another aspect, the invention provides a molten intermediate, comprising: an aliphatic polyester, other than PET, comprising a repeat unit having from two to six carbons in the chain between ester groups, wherein the 2 to 6 carbon chain repeat unit does not include side chain carbons; 0.01 to 0.2 mass % $CaCO_3$; and at least 90 mass % PET, nylon, olefins, other thermoplastic polymers, and combinations thereof. As used herein, the phrase "other than PET" can be expressed as "other than polyethylene terephthalate," or "with the proviso that the aliphatic polyester is not polyethylene terephthalate."

In a further aspect, the invention provides a fiber comprising: an aliphatic polyester, other than PET, comprising a repeat unit having from two to six carbons in the chain between ester groups, wherein the 2 to 6 carbon chain repeat unit does not include side chain carbons; 0.01 to 0.2 mass % $CaCO_3$; and at least 90 mass % PET, nylon, olefins, other thermoplastic polymers, and combinations thereof.

In various embodiments, the textile may have one or any combination of the following properties: biodegradability such that, when subjected to the conditions of ASTM D5511 for 266 days, the textile decomposes at least 40%, or at least 50%, or in the range of 40% to about 80%, or a range of 40% to about 75%; wherein the decomposition products from the ASTM testing are primarily methane and carbon dioxide; a dimensional stability such that the textile maintains its shape and shrinks by less than 10%, or less than 5%, or less than 3%, when subjected to the conditions of Home Laundering Test AATCC 135-2015 1IIAii (machine wash at 80° F., tumble dry, five laundering cycles); wherein the textile is colored and possesses a colorfastness of at least Grade 3, or at least Grade 4, or Grade 5 when subjected to the conditions of AATCC 61-2013 2A (mod 105° F.) or AATCC 8-2016, or AATCC 16.3-2014 (Option 3, 20 AFU); a bursting strength of at least 20 psi, preferably at least 50 psi, or at least 100 psi, or in the range of 50 to about 200 psi, or 50 to about 150 psi, when subjected to the conditions of ASTM D3786/D3886M-13; and a wicking ability such that when subjected to the conditions of AATCC 197-2013; Option B, the textile wicks water over a distance of at least 10 mm or at least 20 mm, or in the range of about 10 or about 20 mm to about 150 mm in 2 minutes.

In yet another aspect, the invention provides a method of making fibers, yarn, or fabric comprising: blending the masterbatch described herein into a polymer comprising: PET, nylon, olefins, other thermoplastic polymers, and combinations thereof to form a molten mixture; extruding the mixture to form filaments; and cooling the filaments. These filaments can be textured and knitted ("filament yarn"), formed into nonwoven webs, or cut into staple for woven, nonwoven and knitted fabric applications. Alternatively, the molten mixture can be extruded to form pellets, and the pellets can be subsequently remelted prior to the step of extruding the mixture to form fibers. In a further aspect, the invention provides a textile, comprising: a fiber comprising $CaCO_3$ and at least 90 mass % PET, nylon, olefins, other thermoplastic polymers, and combinations thereof, and possessing biodegradability such that, when subjected to the conditions of ASTM D5511 for 266 days, the textile decomposes at least 40%, or at least 50%, or in the range of 40% to about 80%, or a range of 40% to about 75%; and wherein the textile comprises one or more of the following properties: a dimensional stability such that the textile maintains its shape and shrinks by less than 10%, or less than 5%, or less than 3%, when subjected to the conditions of Home Laundering Test 5 AATCC 135-2015 1IIAii (machine wash at 80F, tumble dry, five laundering cycles); wherein the textile is colored and possesses a colorfastness of at least Grade 3, or at least Grade 4, or Grade 5 when subjected to the conditions of AATCC 61-2013 2A (mod 105 F) or AATCC 8-2016, or AATCC 16.3-2014 (Option 3, 20 AFU); a bursting strength of at least 20 psi, preferably at least 50 psi, or at least 100 psi, or in the range of 50 to about 200 psi, or 50 to about 150 psi, when subjected to the conditions of ASTM D3786/D3886M-13; and wicking ability such that when subjected to the conditions of AATCC 197-2013, Option B, the textile wicks water over a distance of at least 10 mm or at least 20 mm, or in the range of about 10 or about 20 mm to about 150 mm in 2 minutes.

Advantages of the invention may include, in some preferred embodiments, enhanced biodegradability per mass % of a masterbatch; greater durability of the fiber or textile as compared to other biodegradability treatments; better maintenance of fiber or textile properties.

The foregoing and other objects and advantages of the invention and the manner in which the same are accomplished will become clearer based on the followed detailed description ta ken in conjunction with the accompanying drawings.

BRIEF DESCRIPTION OF THE DRAWINGS

FIG. 7 is a series of photographs illustrating plant testing of the invention.

DETAILED DESCRIPTION OF THE INVENTION

Glossary

Figure 1:
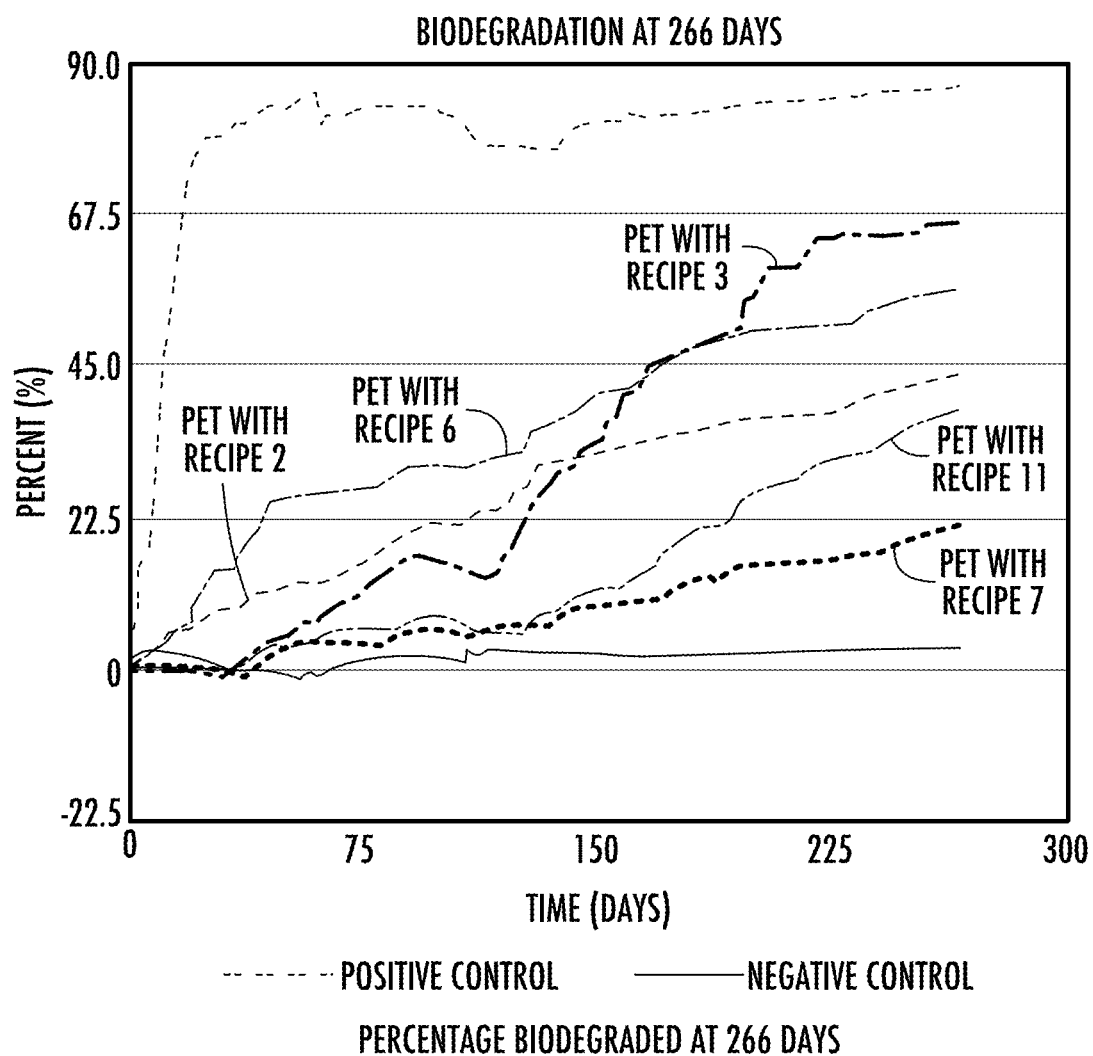
FIGS. 1-5 are plots of percentage (%) biodegradation versus elapsed time (expressed in days) for several embodiments of the present invention along with control examples of cellulosic materials and conventional polymers.

An "aliphatic polyester" contains repeating ester units with hydrocarbon chains comprising open (not aromatic) chains. These may be homopolymers, copolymers containing only aliphatic groups, or copolymers containing both aliphatic groups and aryl groups.

A "carrier polymer" is a polymer in the masterbatch that is the same as, or is compatible and miscible with, the polymer into which the masterbatch is blended.

Denier (Dpf) is the weight in grams of 9,000 meters of the individual filament. It can be calculated by taking the yarn denier and dividing it by the number of filaments in the yarn bundle.

For purposes of the present invention, a non-biodegradable polymer is one that degrades by 10% or less after 266 days of testing according to ASTM D-5511.

PET, nylon, and spandex have the conventional meaning Nylon is a polyamide; one preferred nylon is nylon 6,6. Spandex is a polyether-polyurea copolymer.

Polymers are large molecules (molecular weight over 100 Daltons, typically thousands of Daltons) comprising many repeating units.

A textile is a type of material composed of natural and/or synthetic 5 fibers, filaments or yarn, and may be in knit, woven or non-woven forms.

The term "nonwoven fabric" is well understood by the person of ordinary skill in this art, and is used herein consistent with such understanding including definitions such as those in Tortora, Phyllis G., and Robert S. Merkel. Fairchild's Dictionary of Textiles. 7th ed. New York, N.Y.: Fairchild Publications, 2009, page 387.

Thus, a nonwoven fabric is, "a textile structure produced by bonding or interlocking of fibers, or both; accomplished by mechanical, chemical, thermal, or solvent means and combinations thereof." Exemplary methods of forming the basic web include carding fibers, air laying, and wet forming These webs can be secured or bonded by use of adhesives, including low-melt fibers interspersed among the web, thermal bonding for appropriate thermoplastic polymers, needle punching, spunlace (hydroentanglement), and spun bonded processes.

The skilled person understands that in the textile arts, the word "spinning" has two different definitions, both of which are clear in context. In forming synthetic filament, the term "spinning" refers to the step of extruding the molten polymer into filament.

In the context of natural fibers, or staple fibers cut from textured synthetic filament, the term "spinning" is used in its most historical sense (dating to antiquity) of twisting filaments into a cohesive yarn structure from which fabrics can be woven.

As a general reference, Phyllis G. Tortora and Robert S. Merkel, *Fairchild's Dictionary of Textiles 7th Edition*, New York, Fairchild Publications 2009, provides many other definitions recognized by those of ordinary skill in this art (skilled persons).

ASTM and AATCC testing protocols are considered industry standards. These protocols typically do not change significantly over time; however, if any question arises regarding the dates of these standards, not specified herein, the standard in effect on January 2018 is to be selected.

Unless defined to the contrary, the term "percentage" or the symbol "%" refers to mass percentage ("mass %"), which carries the same meaning in this specification as "weight percentage" or "percent by weight." These usages are well understood in context by the skilled person.

The masterbatch formulation that enables bio-degradation typically comprises a carrier polymer. The carrier polymer is preferably formulated to match the matrix (i.e., the nonbiodegradable polymer). Thus, in exemplary embodiments the carrier polymer is selected from the group consisting of PET, nylon, olefins, other thermoplastic polymers, and combinations thereof. As demonstrated by the examples, PET and nylon, in combination with other components of the invention, have been shown to result in superior biodegradability in a launderable textile.

Surprisingly, the inventors have discovered that the addition of calcium carbonate in the masterbatch substantially increases the biodegradability of the resulting textiles while avoiding negative effects on launderability.

Although the invention is not limited by the mechanism by which calcium carbonate operates, and although the inventors do not wish to be bound by any particular theory, the following hypothesis appears reasonable. The presence of microscopic inorganic particles of calcium carbonate mixed in a homogenous organic polymeric matrix introduces a plethora of nucleation points for biodegradation. This calcium carbonate is dosed simultaneously with other biodegradable ingredients, rendering the nucleation points to be in close proximity with these ingredients. Calcium ions may play an important role in bacterial growth. Calcium binding proteins present in bacteria help in signal transduction, and may assist in the important process of positive chemotaxis where the bacteria move towards higher concentrations of a chemical.

According to this hypothesis, the breakdown of the polymer into monomers and oligomers by hydrolysis of the ester linkages by the action of anaerobic bacteria are accelerated by the presence of dispersed calcium carbonate. The presence of carbon dioxide, a metabolic byproduct, can also enhance the dissolution of calcium carbonate present in the polymer matrix.

Another mechanism where calcium and calcium binding proteins in bacteria can play an important role is in quorum sensing; i.e., a means of communication in bacteria optimized for population growth. The individual bacteria work to create a hydrogel, composed of bacteria and extra cellular polymeric materials that create a coordinated functional community. This macroscopic structure magnifies the bacterial action and helps lead to the biodegradation of polymers according to the invention, especially high surface area microfibers that can be incorporated into such a hydrogel.

The masterbatch formulation is embedded within the polymer matrix. As a further aspect of the hypothesis, the chemical part of the hydrolytic attack on the polymer chains begins from within The masterbatch dispersed within the matrix creates nucleation points for attack and exponentially multiplies the fiber surface area. The bacterial enzymes attack from the outside working their way in. Bacteria, being in the 1 micron range, will initially work on the textile fibers from the outside, but as the polymer matrix solvates and breaks down, new surface area is exposed. With the formation of a coordinated bacterial community in the hydrogel, large polymeric chains are broken down to oligomeric chains and further broken into monomers and digested into $CO_2$ and $CH_4$.

As a result, the masterbatch of the invention can be thought of acting in two phases: physiochemical at the beginning to break down to smaller bits and biochemical in the latter half to digest the 25 material.

In some embodiments, the fibers in the yarns or textiles have a denier per filament (dpf) in the range of 1 to 50 or 2 to 30, or as high as 1,000. The denier of the fibers is not believed to be critical in the biodegradability because the fibrous textiles will generally have sufficient surface area to support bacterial growth.

In exemplary embodiments, the masterbatch comprises at least 0.5 mass % calcium carbonate, in some embodiments up to 10% calcium carbonate, in some cases between about 0.5 and 5% calcium carbonate, and typically at least about 1.0% calcium carbonate. The inventive compositions preferably use fine calcium carbonate powders, preferably having a mass average particle size of 15 microns (μm) or less, 10 μm or less, in some embodiments 7 μm or less, and may be in the range of a mass average particle size of between 0.1 and 10 μm, or between 1 and 8 μm, or between 5 and 8 μm. As is conventional, particle size can be measured by commercial photoanalysis equipment or other conventional means. The calcium carbonate powder has a surface area of at least 0.5 square meters per gram ($m^2/g$); in some cases at least 1.0 $m^2/g$ and in some embodiments between 0.5 and 10 $m^2/g$. As is conventional, surface area can be determined by a method such as the ISO 9277 standard for calculating the specific surface area of solids which in turn is based on the Brunauer-Emmett-Teller (BET) theory.

In some preferred embodiments, the masterbatch formulation contains one or any combination of the following: polycaprolactone (PCL), polyhydroxybutyrate (PHB), polybutylene succinate (PBS), polylactic acid (PLA), and poly(tetramethylene adipate-coterephthlate). Polycaprolactone, or blends comprising PCL as the major aliphatic polyester component appear favorable because, surprisingly, PCL was found to outperform polylactic acid (PLA), PHB and PBS.

Because textiles need to be durable, the masterbatch and textile compositions should avoid components that adversely affect durability. Preferably, the compositions have less than 5 mass %, more preferably less than 2%, or less than 1% of saccharides; or less than these amounts of furanones; or less than these amounts of organic (carbon-based) components that leach out during laundering. In some embodiments, the inventive compositions lack any components that substantially diminish laundering durability.

The textiles preferably have a dimensional stability such that the textile maintains its shape and shrinks by less than 10%, or less than 5%, or less than 3%, as measured by Home Laundering Test AATCC 135-2015 1IIAii (machine wash at 80 F, tumble dry, five laundering cycles).

The textiles or fibers may be colored (such as red, blue, green, etc.) and preferably possess a colorfastness of at least Grade 3, or at least Grade 4, or Grade 5 as measured by AATCC 61-2013 2A (mod 105 F) or AATCC 8-2016, or AATCC 16.3-2014 (Option 3, 20 AFU). A sheet of the textile (for example a fabric sample cut from a shirt or pants) preferably has a bursting strength of at least 20 psi, preferably at least 50 psi, or at least 100 psi, or in the range of 50 to about 200 psi, or 50 to about 150 psi, where bursting strength is measured 30 according to ASTM D3786/D3886M-13.

In some preferred embodiments, the fabrics have no piling or fuzziness (Grade 5 according to ASTM D 3512M-16).

In some embodiments, the textile wicks water; this is especially desirable in clothing in which sweat is wicked away from the wearer; in some preferred embodiments the fabric wicks water over a distance of at least 10 mm or at least 20 mm, or in the range of about 10 or about 20 mm to about 150 mm in 2 minutes; as measured by AATCC 197-2013. Measurements of textiles made according to some embodiments of the invention are shown in the performance testing comparison tables (i.e., Tables 1-7).

In some cases, the precise chemical structure within the fibers may not be known and one, or a combination, of the properties discussed above is the most accurate and/or precise way to characterize the textile. The masterbatch is blended with a non-biodegradable polymer such as polyethylene terephthalate, nylon, olefins, other thermoplastic polymers, and combinations thereof. For purposes of the present invention, a non-biodegradable polymer is one that degrades by 10% or less (preferably 5% or less, in some embodiments, 3% or less, and in some embodiments between 2 and 10% or 2 and 5%) after 266 days of testing according to ASTM D-5511 when the polymer does not contain the additives (in other words, prior to blending with the masterbatch). The fiber comprises at least 50 mass %, more preferably at least 70%, still more preferably at least 90%, or at least 95%, and in some embodiments at least 99% of a polymer selected from the group consisting of polyethylene terephthalate (PET), nylon, olefins, other thermoplastic polymers, and combinations thereof.

The invention includes textiles comprising these fibers, either as single component textiles or in mixtures with other fibers. Many textiles comprise mixtures (blends) of fibers, for example, textiles containing spandex often include cotton fibers. In some embodiments, the textiles include at least 10%, or at least 20%, or at least 50%, or at least 80%, or at least 90%, or 100% of the fibers made from polyethylene terephthalate (PET), nylon, olefins, other thermoplastic polymers, and combinations thereof.

Fibers produced from the masterbatch typically include at least 90 mass % of a non-biodegradeable polymer. Because the masterbatch is preferably added in an amount between 0.5 to 5%, preferably at least 1%, in some embodiments between 1 and 5%, in some embodiments between 2 and 5%, and because all of the masterbatch is present in the resulting composition, the resulting fibers will contain the corresponding amounts of materials.

The invention also includes blended intermediates, fibers, yarns and textiles. Examples of finished products according to the present invention include: knit fabrics, woven fabrics, nonwoven fabrics, apparel, upholstery, carpeting, bedding such as sheets or pillowcases, industrial use fabrics for agriculture or construction. Examples of apparel include: shirts, pants, bras, panties, hats undergarments, coats, skirts, dresses, tights, stretch pants, and scarves.

The calcium carbonate particles are, of course milled to a size useful for the invention. Expressed functionally, the milled particles can be as small as possible, and very small particles present no disadvantage.

An upper limit of particle size is, however, defined in part by the denier, which the lay person would describe in terms of diameter. In those terms, the average calcium carbonate particle size should be no larger than 10% of the diameter of the extruded filament, and the maximum particle size should be no greater than 20% of the diameter of the extruded filament, because particle sizes greater than about 10% of filament diameter are much more likely to lead to breakage at all phases of production and use.

As noted above, the lower limit is less critical, with the main consideration being the increased difficulty and cost of producing ever smaller particles.

Thus, as a practical example a one denier (1 D) polyester fiber has a diameter of 10 microns ($\mu$), meaning that the calcium carbonate particle size should not exceed about 1$\mu$. Skilled persons will be able to select relevant particle sizes based on this general 10% relationship.

In a similar relationship, the masterbatch composition can be produced in solid chip form for storage and transportation. The end user can then mill the chip into the desired sizes for their particular end use applications.

In some embodiments, the milled masterbatch particles are then mixed with a liquid which will in turn be miscible with the desired end polymer. As an example (but not a limitation), polyethylene glycol or ethyl alcohol are suitable for polyester processes.

As further considerations, the prepared masterbatch can be added to the target polymer at alternative stages of production. As one option, the masterbatch can be added to a polymer production line after the polymer has been made, but while the polymer remains in the molten state.

Alternatively, the masterbatch can be added to a continuous polymer line during polymerization of the target polymer. In such arrangements, the masterbatch works well if miscible with the last stage of polymerization, for example, in the high polymerizer of a continuous line.

Spandex. In the context of the invention, spandex can be the target polymer for the masterbatch process provided that the spandex is melt spinnable. The skilled person recognizes that variations of spandex are solvent-spun rather than melt-spun, and the invention is used with the melt-spun versions.

Examples throughout this description are not intended to be limiting, but, in various embodiments, the invention can be characterized by any selected combination of features. In some embodiments, the compositions can be defined, in part, by the absence of certain components. In some embodiments, the compositions avoid including starch or saccharides; such components can be excessively soluble and lead to textiles that lack sufficient durability. The additives such as polybutylene succinate preferably do not copolymerize with the non-biodegradable polymer but form degradable phases within the compositions.

In some embodiments, the compositions of the invention avoid aliphatic aromatic polyesters.

The inventive fibers, yarns, and fabrics can be characterized by their physical properties such as by the ASTM and/or AATCC tests described in the Examples. For instance, the fibers, yarns, and fabrics can be defined by the extent of degradation according to an ASTM test on a basis of mass % biodegradation agent in the fiber. The molecular composition of the precursors, intermediates and final products can be determined by conventional methods such as gel permeation chromatography, more preferably gradient analysis of polymer blends.

The skilled person will understand, of course, that once the master batch is used in conjunction with the main polymer, the compositional numbers will change in proportion to the relative amount of masterbatch added to main polymer.

The skilled person will also understand that when the invention is considered in its embodiment as a molten intermediate, the melt can be extruded in the form of either pallets or filament in the most common textile applications. Extruding and quenching the melt as pellets provides the opportunity to store, ship, and re-melt the pellets at a different location; e.g. at a customer's location.

When quenched filaments from the composition can be textured using techniques well understood by the skilled person, following which fabric can be formed directly from the textured filament ("filament yarn"), or the textured filament can be cut into staple fiber. Such staple fiber can in turn be spun into a yarn, most commonly in an open-end system, but obviously ring-spinning as well. The yarn can in turn be formed into fabrics (woven, knitted, nonwoven) or can be blended with another polymer (e.g., rayon), or with natural fiber (cotton or wool) to form a blended yarn which in turn can be made into fabrics having the characteristic of the blended fibers.

Any recipe from table 1 can be used in any of the filament, pellet, staple fiber, textured staple fiber, textured filament, or fabrics referred to herein.

As used herein the term "nap" as well as "napping" or "napped" refer to the well-understood finishing step for manufactured textiles e.g., Tortora, supra at pages 378-79. In this context, the invention is also useful in polar fleece; i.e. the soft napped insulating fabric typically made from polyester.

When formed into appropriate filament, the compositions according to the invention are expected to work very well as the filling for insulated garments.

The nature, structure, and many variations of insulated garments are well understood to the skilled person. Basically, an insulating material is enclosed in a lightweight shell, for which low denier nylon is typical, often including a water repellent treatment that can withstand at least some precipitation.

Down is of course the best insulating material based on weight-for-weight compressibility, loft, and warmth-to-weight ratio, but synthetic fillers such as the present invention offer lower cost, and better insulating properties when wet, even though slightly heavier and slightly less compressible.

As another example, filaments, fibers and yarns according to the invention are expected to perform very well as a biodegradable carpet, or portions of such carpets. As well understood by the skilled person, a carpet is a textile floor covering typically formed of pile yarns or tufting yarns attached to a backing Prior to the advent of synthetic materials, and still used currently, typical pile was made from wool and the backing was made of a woven fabric into which the yarn could be woven, tufted or otherwise attached.

The skilled person typically uses the terms "carpet" and "rug" interchangeably although in some context a "carpet" covers an entire room ("wall-to-wall carpeting") and a "rug" covers an area smaller than a full room.

Because synthetic material such as nylon, polypropylene, polyester, and blends of these with wool are useful carpet materials, fibers or yarns formed from the invention are entirely appropriate and useful for carpeting. The skilled person recognizes a wide variety of backing materials, backing structures, and means of attaching pile or tuft to the backing. Repeating all such possibilities would be redundant rather than clarifying and the skilled person can adopt the necessary materials and steps in any given context and without undue experimentation.

EXAMPLES

A variety of masterbatch compositions were prepared having the compositions shown in Table 1.

TABLE 1

| Recipe # | 2 | 3 | 4 | 5 | 6 | 7 | 8 | 9 | 10 | 11 | 12 | 13 | 14 |
|---|---|---|---|---|---|---|---|---|---|---|---|---|---|
| PET | 40 | 40 | 40 | 40 | 40 | 40 | 40 | 40 | 40 | 40 | 40 | 40 | 39 |
| PCL | 49 | 49 | 49 | 49 | 49 | 39 | 49 | 39 | 39 | 39 | 49 | 39 | 39 |
| PLA | 10 | 0 | 0 | 0 | 0 | 0 | 0 | 10 | 0 | 0 | 5 | 0 | 0 |
| P3HB (PHA) | 0 | 10 | 0 | 5 | 0 | 0 | 0 | 0 | 10 | 10 | 0 | 10 | 10 |
| PBS-version 1 | 0 | 0 | 0 | 0 | 10 | 0 | 0 | 0 | 0 | 0 | 0 | 0 | 0 |
| PBS-version 2 | 0 | 0 | 10 | 0 | 0 | 20 | 0 | 0 | 0 | 10 | 0 | 10 | 10 |
| $CaCO_2$ | 1 | 1 | 1 | 1 | 1 | 1 | 1 | 1 | 1 | 1 | 1 | 0 | 1 |
| PBAT | 0 | 0 | 0 | 5 | 0 | 0 | 10 | 10 | 10 | 0 | 5 | 0 | 0 |
| $SiO_2$ | 0 | 0 | 0 | 0 | 0 | 0 | 0 | 0 | 0 | 0 | 0 | 1 | 1 |
| Total (in %) | 100 | 100 | 100 | 100 | 100 | 100 | 100 | 100 | 100 | 100 | 100 | 100 | 100 |

These masterbatches were blended into polyethylene terephthalate (1% of masterbatch is typical) and fed with a gravimetric feeder in a closed loop to the melt extruder fitted with twin screws. The additive batch is mixed at 250° C. and extruded via a strand die into a water bath or equivalent quenching equipment. After a classifier removes particles at the extreme ends of the pellets' size distribution, the pellets are dried and bagged.

The calcium carbonate utilized in the testing had a mass average particle size of 6.5 microns and a surface area of about 1.5 square meters per gram.

Figure 2:
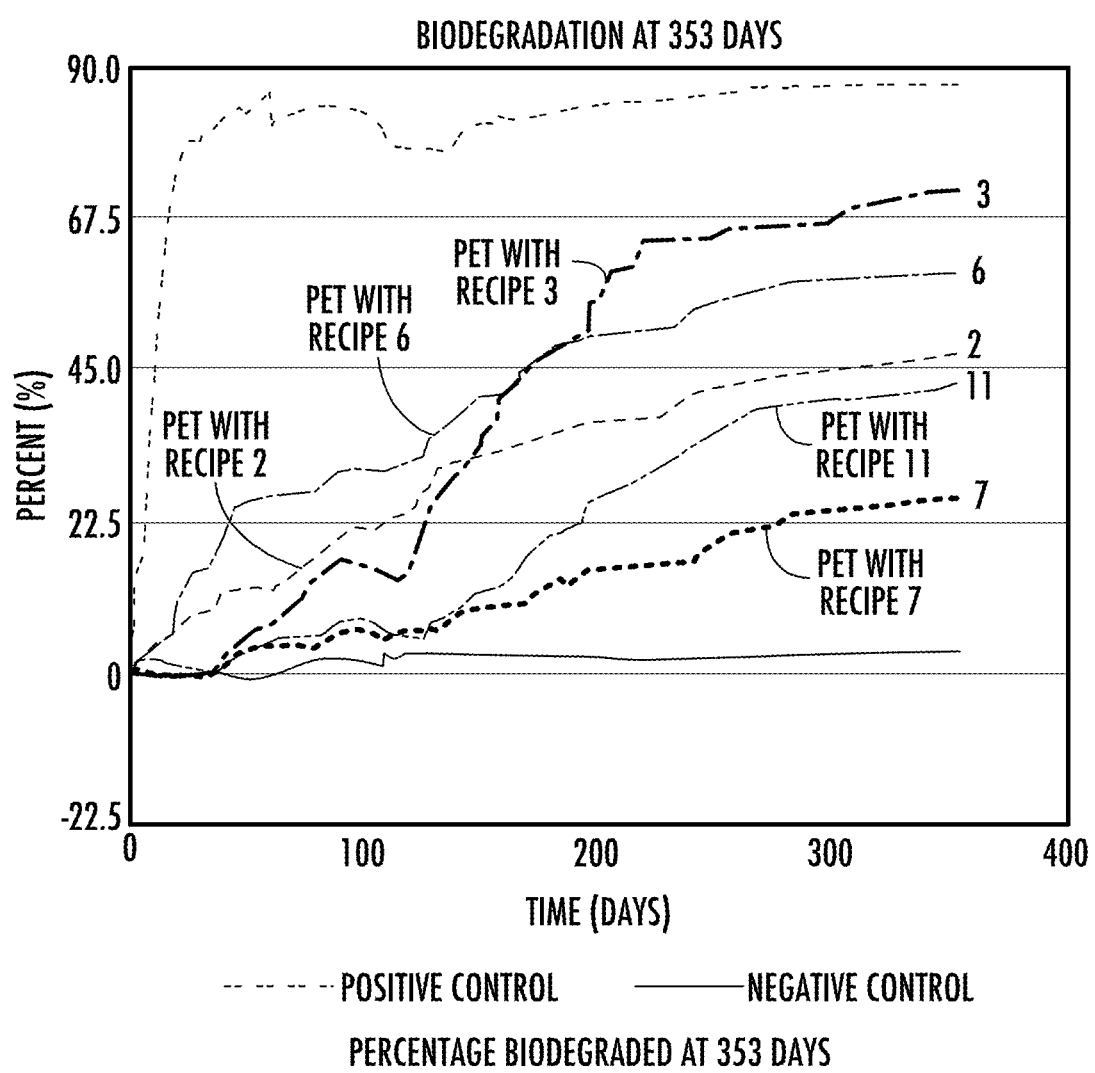

The formulations were extruded into PET at a 1% load rate and the recipes that were most compatible with the extrusion process were tested for degradation according to ASTM D5511. The results are shown in FIG. 1 and Table 2 in for 266 days and in FIG. 2 and Table 3 for 353 days.

TABLE 2

266 Day ASTM D5511 Biodegradation Update- Fibers From Selected Recipes

| | Inoculum | Negative | Positive | Recipe #2 | Recipe #3 | Recipe #6 | Recipe #7 | Recipe #11 |
|---|---|---|---|---|---|---|---|---|
| Cumulative Gas Volume (mL) | 3567.7 | 4312.7 | 11822.8 | 15922.6 | 20920.1 | 19036.7 | 9476.7 | 13849.5 |
| Percent $CH_4$ (%) | 47.2 | 44.7 | 42.6 | 48.2 | 53.3 | 48.4 | 49.6 | 51.8 |
| Volume $CH_4$ (mL) | 1682.6 | 1925.7 | 5030.9 | 7680.8 | 11143.6 | 9214.4 | 4698.8 | 7176.8 |
| Mass $CH_4$ (g) | 1.20 | 1.38 | 3.59 | 5.49 | 7.96 | 6.58 | 3.36 | 5.13 |
| Percent $CO_2$ (%) | 38.8 | 38.2 | 41.0 | 35.4 | 35.7 | 37.5 | 35.7 | 35.4 |
| Volume $CO_2$ (mL) | 1385.1 | 1648.2 | 4849.0 | 5640.3 | 7461.6 | 7137.6 | 3383.4 | 4907.0 |
| Mass $CO_2$ (g) | 2.72 | 3.24 | 9.52 | 11.08 | 14.66 | 14.02 | 6.65 | 9.64 |
| Sample Mass (g) | 1000 | 10 | 10 | 20 | 20 | 20 | 20 | 20 |
| Theoretical Sample Mass (g) | 0 | 8.6 | 4.2 | 12.6 | 12.6 | 12.6 | 12.6 | 12.6 |
| Biodegraded Mass (g) | 1.64 | 1.96 | 5.29 | 7.14 | 9.97 | 8.76 | 4.33 | 6.47 |

TABLE 2-continued

266 Day ASTM D5511 Biodegradation Update- Fibers From Selected Recipes

|  | Inoculum | Negative | Positive | Recipe #2 | Recipe #3 | Recipe #6 | Recipe #7 | Recipe #11 |
|---|---|---|---|---|---|---|---|---|
| Percent Biodegraded (%) |  | 3.2 | 86.5 | 43.6 | 66.1 | 56.5 | 21.3 | 38.3 |

TABLE 3

353 Day ASTM D5511 Biodegradation Update-Fibers From Selected Recipes

|  | Inoculum | Negative | Positive | Recipe #2 | Recipe #3 | Recipe #6 | Recipe #7 | Recipe #11 |
|---|---|---|---|---|---|---|---|---|
| Cumulative Gas Volume (mL) | 3567.7 | 4397.5 | 11886.0 | 16868.9 | 22359.2 | 19793.3 | 10703.0 | 15057.3 |
| Percent $CH_4$ (%) | 47.2 | 44.9 | 42.6 | 48.6 | 53.4 | 48.6 | 50.2 | 52.1 |
| Volume $CH_4$ (mL) | 1682.6 | 1975.8 | 5068.1 | 8197.3 | 11943.1 | 9622.8 | 5368.6 | 7176.87840.4 |
| Mass $CH_4$ (g) | 1.2 | 1.41 | 3.62 | 5.86 | 8.53 | 6.87 | 3.83 | 5.60 |
| Percent $CO_2$ (%) | 38.8 | 38.2 | 41.0 | 35.3 | 35.6 | 37.3 | 35.4 | 35.3 |
| Volume $CO_2$ (mL) | 1385.1 | 1678.5 | 4871.0 | 5955.1 | 7968.3 | 7380.2 | 3792.4 | 5317.5 |
| Mass $CO_2$ (g) | 2.72 | 3.30 | 9.57 | 11.70 | 15.65 | 14.50 | 7.45 | 10.45 |
| Sample Mass (g) | 1000 | 10 | 10 | 20 | 20 | 20 | 20 | 20 |
| Theoretical Sample Mass (g) | 0 | 8.6 | 4.2 | 12.6 | 12.6 | 12.6 | 12.6 | 12.6 |
| Biodegraded Mass (g) | 1.64 | 1.96 | 5.32 | 7.58 | 10.67 | 9.11 | 4.91 | 7.05 |
| Percent Biodegraded (%) |  | 3.7 | 87.2 | 47.1 | 71.6 | 59.2 | 25.9 | 42.9 |

Initial readings were taken at 59 days; at this very early reading it appeared that recipe 13 (Table 1) showed 3.9% degradation while recipe 14 did not appear to have started to degrade at all. Based upon a barometric event and noise in the data, however, it appears that the data from recipes 13 and 14 is unreliable and unreproducible. Additionally, such a low degradation reading is too close to baseline to be relied upon (3% degradation for the PET without additive) and testing of these recipes was stopped.

The results shown above demonstrate superiority over the prior art. In these landfill conditions, the PET fibers degrade to methane and carbon dioxide. After 266 days, the PET samples made with 1 mass % of the masterbatch recipes #2, 3, 6, 7, and 11 in the Table degraded 43.6, 66.1, 56.5, 21.3, and 38.3%, respectively. The unmodified PET degraded 3.2% under the same conditions. The highest degradation occurred from a masterbatch containing 49% polycaprolactone and 10% polyhydroxybutyrate, while the lowest degradation occurred from a masterbatch containing 39% polycaprolactone and 20% polybutylene succinate. The material made from 49% polycaprolactone and 10% polyhydroxybutyrate also degraded substantially better than the PET modified with 1% of a masterbatch containing 39% polycaprolactone, 10% polyhydroxybutyrate and 10% polybutylene succinate.

The results above can be compared with the results reported in WO 2016/079724 ("Table 1—Results after 300 days") in which polyamide fibers were melt-spun using 2% of masterbatch of the commercially available biodegradation agent Eco-One® (https://ecologic-llc.com/about/eco-one-video-tour; accessed Feb. 11, 2019). The resulting fibers were tested via the ASTM D5511 standard and were found to degrade 13.9% ("PA 6.6") or 15.5% ("PA 5.6") after 300 days. The WO 2016/079724 fibers without biodegradation agent degraded 2.2 and 2.3% under the same ASTM D5511 testing.

Based on the unmodified fibers, and ignoring the difference between 266 and 300 days, conventional PET (Table 2 herein) appears to be 3.2/2.25=1.42× more degradable than the polyamide fibers in WO 2016/079724. In comparison, the modified PET according to the invention, was between 21.3/15.5=1.37× and 66.1/15.5=4.26× more degradable than the modified polyamide fibers in WO 2016/079724. Correcting for the fact that the polyamide fibers in WO 2016/079724 were modified by twice as much masterbatch (2% versus 1%), the PET according to the invention was between 2.74× and 8.52× more degradable. Correcting for the 2.74/1.42 difference between the unmodified polyester and polyimide, the present invention demonstrated between 1.92× and 3.00× greater biodegradability.

Figure 3:
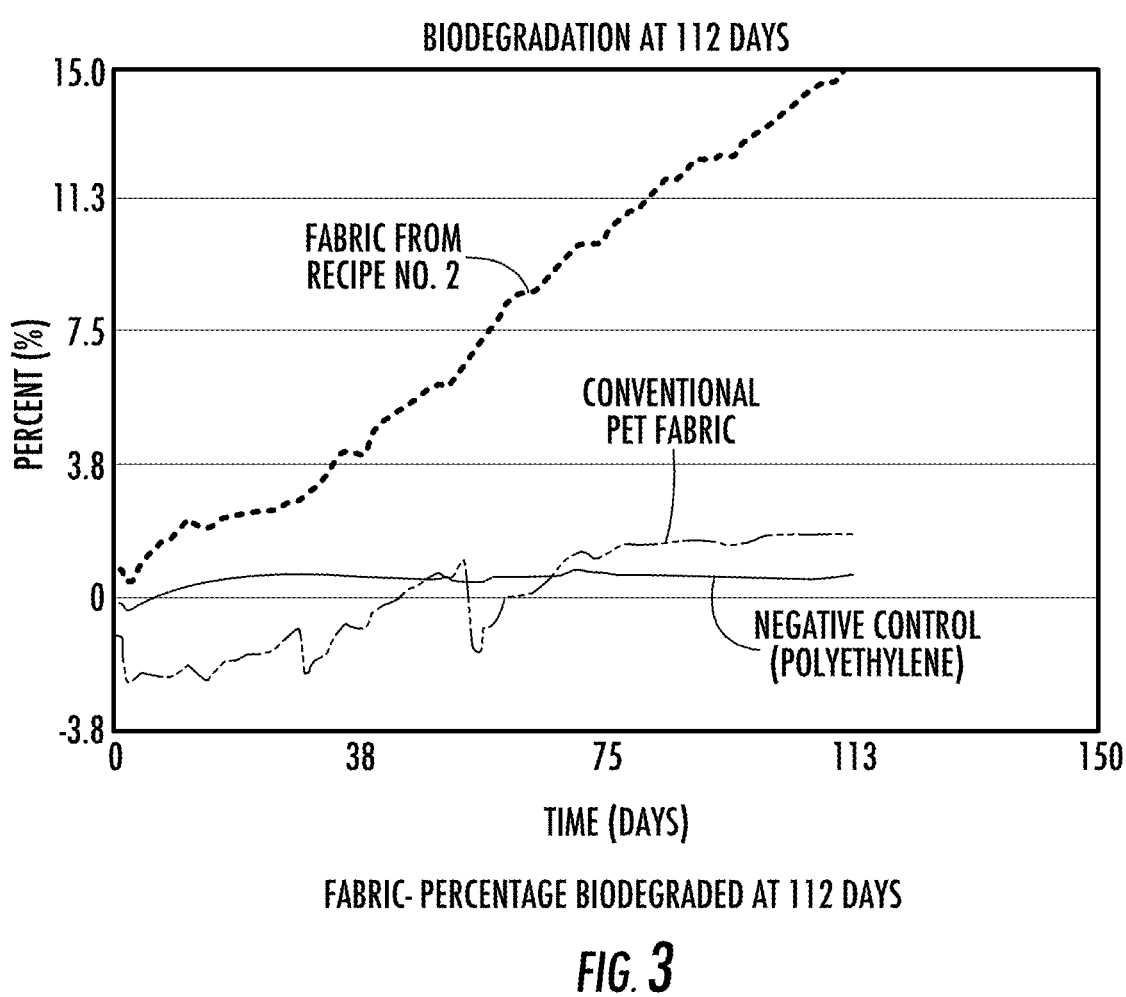

Table 4 and FIG. 3 show the improvement in the biodegradation of fabrics made from Recipe 2 (Table 1) and a control polyester.

TABLE 4

112 Day ASTM D5511 Biodegradation Update -Fabrics from a Selected Recipe and a Control

|  | Inoculum | Negative | Positive | Fabric from PET w/Recipe #2 | Fabric from conventional PET |
|---|---|---|---|---|---|
| Cumulative Gas Volume (mL) | 1420.6 | 1588.7 | 10124.6 | 5480.3 | 1753.7 |
| Percent $CH_4$ (%) | 24.0 | 28.9 | 39.7 | 43.5 | 41.6 |
| Volume $CH_4$ (mL) | 340.8 | 459.3 | 4024.5 | 2384.0 | 729.5 |
| Mass $CH_4$ (g) | 0.24 | 0.33 | 2.87 | 1.70 | 0.52 |
| Percent $CO_2$ (%) | 48.8 | 41.9 | 42.1 | 38.5 | 40.0 |
| Volume $CO_2$ (mL) | 692.7 | 665.5 | 4261.7 | 2109.6 | 701.1 |
| Mass $CO_2$ (g) | 1.36 | 1.31 | 8.37 | 4.14 | 1.38 |
| Sample Mass (g) | 10 | 10 | 10 | 20 | 20 |
| Theoretical Sample Mass (g) | 0 | 8.6 | 4.2 | 12.4 | 12.4 |
| Biodegraded Mass (g) | 0.55 | 0.60 | 4.44 | 2.41 | 0.77 |
| Percent Biodegraded (%) |  | 0.6 | 92.1 | 15.0 | 1.7 |

ASTM D5210—Anaerobic Degradation in the Presence of Sewage Sludge

Figure 4:
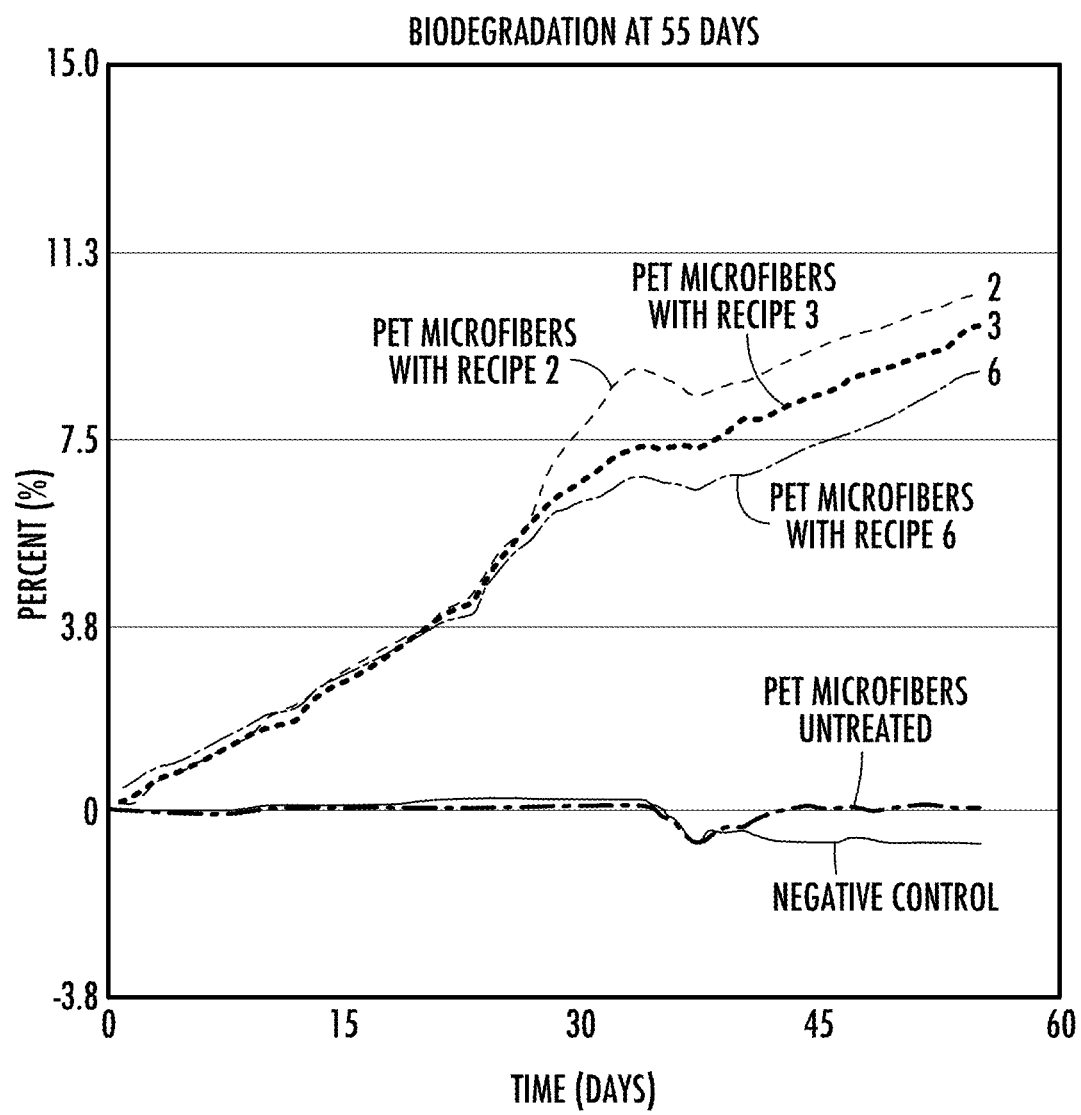

The finished fabrics from two formulations were stone tumbled to create microfibers and the microfibers were tested for degradation according to ASTM D5210 for 55 days which models the conditions typically experienced in a water treatment facility. The results are shown in Table 5 and FIG. 4.

TABLE 5

55 Day ASTM D5210 Biodegradation Update -Microfibers from Selected Recipes

|  | Inoculum | Negative | Positive | PET Microfibers Untreated | PET Microfibers Recipe #2 | PET Microfibers Recipe #6 | PET Microfibers Recipe #3 |
|---|---|---|---|---|---|---|---|
| Cumulative Gas Volume (mL) | 377.9 | 274.6 | 5515.8 | 397.9 | 3268.4 | 2895.2 | 3160.5 |
| Percent $CH_4$ (%) | 49.8 | 45.3 | 53.6 | 47.0 | 42.0 | 41.2 | 43.3 |
| Volume $CH_4$ (mL) | 188.2 | 124.5 | 2958.2 | 186.9 | 1372.6 | 1194.1 | 1368.3 |
| Mass $CH_4$ (g) | 0.13 | 0.09 | 2.11 | 0.13 | 0.98 | 0.85 | 0.98 |
| Percent $CO_2$ (%) | 37.9 | 38.4 | 37.3 | 42.2 | 41.8 | 41.0 | 38.8 |
| Volume CO2 (mL) | 143.1 | 105.5 | 2055.9 | 167.8 | 1365.3 | 1188.3 | 1226.7 |
| Mass $CO_2$ (g) | 0.28 | 0.21 | 4.04 | 0.33 | 2.68 | 2.33 | 2.41 |
| Sample Mass (g) | 10 | 10 | 10 | 20 | 20 | 20 | 20 |
| Theoretical Sample Mass (g) | 0 | 8.6 | 4.2 | 12.4 | 12.4 | 12.4 | 12.4 |
| Biodegraded Mass (g) | 0.18 | 0.12 | 2.69 | 0.19 | 1.47 | 1.28 | 1.39 |
| Percent Biodegraded (%) |  | −0.6 | 59.4 | 0.1 | 10.4 | 8.9 | 9.8 |

ASTM D6691—Aerobic Degradation Modeling a Marine Environment

Figure 5:
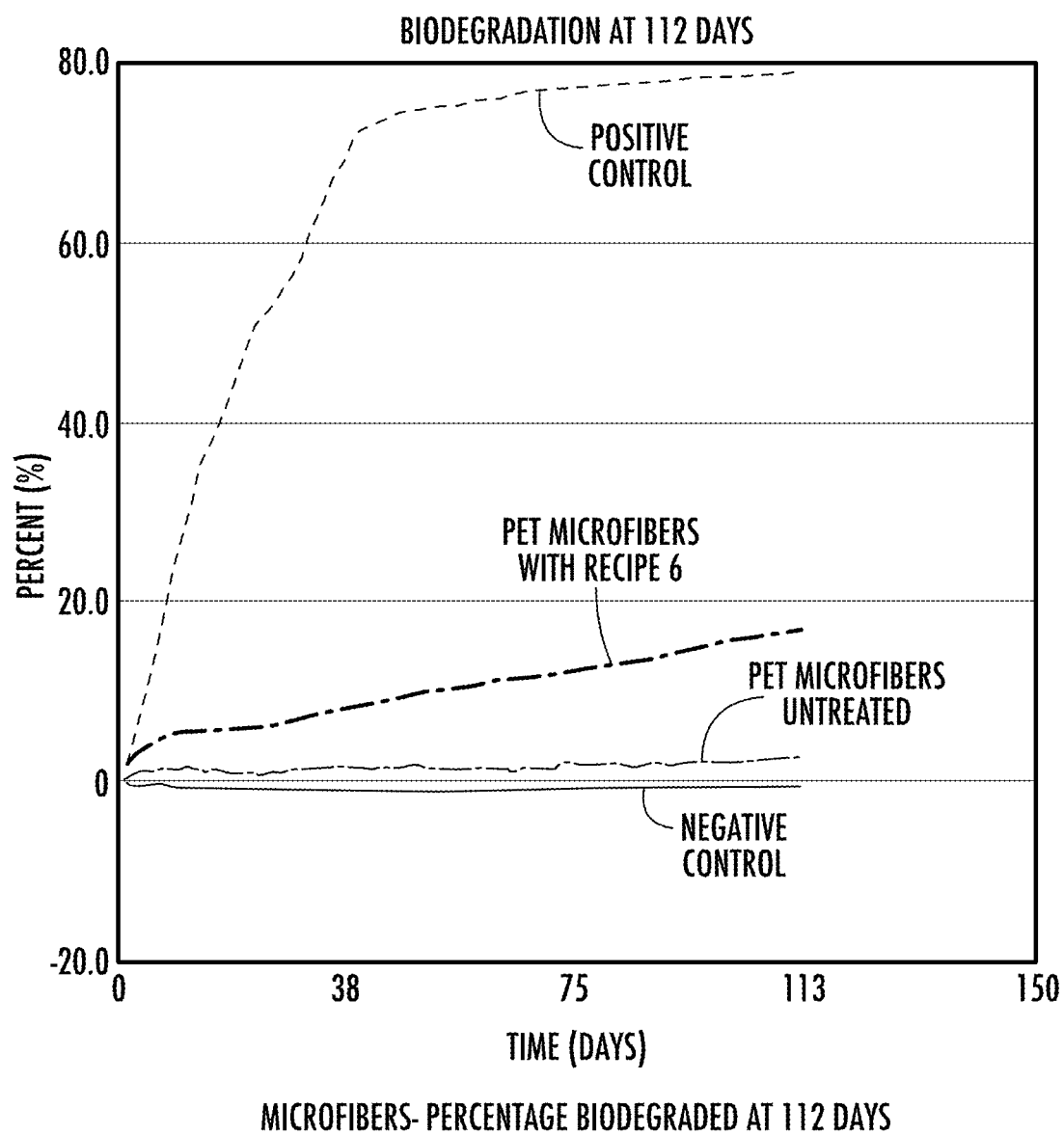

The finished fabric from one formulation was stone tumbled to create microfibers and the microfibers were tested for degradation according to ASTM D6691 for 112 days. The results are summarized in Table 6 and FIG. 5.

TABLE 6

112 Day ASTM D6691 Biodegradation Update -Microfibers From a Selected Recipe and a PET Control

|  | Inoculum | Negative | Positive | PET Microfibers Untreated | PET Microfibers Recipe #6 |
|---|---|---|---|---|---|
| Cumulative Gas Volume (mL) | 9.93 | 8.63 | 86.55 | 16.17 | 39.5 |
| Percent $CO_2$ (%) | 75.23 | 74.22 | 80.94 | 70.50 | 77.0 |
| Volume $CO_2$ (mL) | 7.47 | 6.41 | 70.06 | 11.40 | 30.4 |
| Mass $CO_2$ (g) | 0.015 | 0.013 | 0.138 | 0.022 | 0.060 |

TABLE 6-continued

112 Day ASTM D6691 Biodegradation Update -Microfibers
From a Selected Recipe and a PET Control

|  | Inoculum | Negative | Positive | PET Microfibers Untreated | PET Microfibers Recipe #6 |
|---|---|---|---|---|---|
| Sample Mass (g) | 1000 | 0.1 | 0.1 | 0.1 | 0.10 |
| Theoretical Sample Mass (g) | 0 | 0.09 | 0.04 | 0.07 | 0.07 |
| Biodegraded Mass (g) | 0.004 | 0.003 | 0.038 | 0.006 | 0.016 |
| Percent Biodegraded (%) |  | −0.66 | 79.45 | 2.81 | 16.9 |

Example—Nontoxicity

A composition was tested using the ASTM E1963 method, a protocol to conduct plant toxicity tests using terrestrial plant species such as bean, corn and peas to determine effects of test substances on plant growth and development. The peas are a good indicator, because they are very sensitive to soil conditions. The leachate of residual soil containing the byproducts from ASTM D5511 testing from Recipe 2 were used in this ASTM E 1963 test. FIG. 7 shows the results from the ASTM E 1963 Test.

Inspecting the growth of the plants in the background (1st column) and sample (3rd column), demonstrates that there is no inhibitory effect of leachate from the relevant byproducts sample on plant growth.

TABLE 7

Examples of Textile Properties With and Without Masterbatch

| Test Type | Fabric With Invention | Fabric Without Invention | Explanation Of Test Results |
|---|---|---|---|
| Dimensional changes after home laundering AATCC 135- 2015, 1lllAii (Machine wash cold normal cycle at 80° +/− 5° F.; tumble dry low) After 5 launderings LENGTH (average) Remarks: (+) means extension (−) means shrinkage | −1.7 | −2.7 | Both fabrics have extremely low shrinkage rates, percentages +/−3% are considered to be excellent results. There is a negative difference between the invention and conventional versions |
| Dimensional changes after home laundering AATCC 135- 2015, 1lllAii (Machine wash cold normal cycle at 80° +/− 5° F.; tumble dry low) After 5 launderings WIDTH (average) Remarks: (+) means extension (−) means shrinkage | −1.3 | −0.9 | Both fabrics have extremely low shrinkage rates, percentages +/−3% are considered to be excellent results. There is a negative difference between the invention and conventional versions |
| Colorfastness to accelerated laundering AATCC 61-2013 2A mod105° F. COLOR CHANGE Grade 5-negligible or no color change or staining/color transfer Grade 4-slight to negligible color change or staining/color transfer Grade 3-noticeable color change or staining/color transfer Grade 2-considerable color change or staining/color transfer Grade 1-much color change or staining/color transfer | 4.5 | 4.5 | Both fabrics were tested using accelerated laundry methods with elevated temperatures. General color change/colorfastness show slight to negligible color change, a 4.5 is considered good/excellent according to industry standards. There is no difference between the invention and conventional versions |
| Colorfastness to crocking: Crockmeter method AATCC 82016 (as received) DRY Grade 5-negligible or no color change or staining/color transfer Grade 4-slight to negligible color change or staining/color transfer Grade 3-noticeable color change or staining/color transfer Grade 2-considerable color change or staining/color transfer Grade 1-much color change or staining/color transfer | 3.5 | 3.5 | Test specimen is rubbed with DRY white crock test cloth under controlled conditions. Both fabrics colorfastness is within acceptable range, even though some color transfer is noticeable. There is no difference between the invention and the conventional fabric |

TABLE 7-continued

Examples of Textile Properties With and Without Masterbatch

| Test Type | Fabric With Invention | Fabric Without Invention | Explanation Of Test Results |
|---|---|---|---|
| Colorfastness to crocking: Crockmeter method AATCC 82016 (as received) WET Grade 5-negligible or no color change or staining/color transfer Grade 4-slight to negligible color change or staining/color transfer Grade 3-noticeable color change or staining/color transfer Grade 2-considerable color change or staining/color transfer Grade 1-much color change or staining/color transfer | 3.5 | 4.0 | Test specimen is rubbed with WET white crock test cloth under controlled conditions. Both fabrics colorfastness is within acceptable range, even though some color transfer is noticeable. The difference between a 3.5 and 4 is insignificant |
| Colorfastness to light AATCC 16.3-2014; option 3 (20 AFU) Light source Xenon Color change Colorfastness key to grade ratings (determined through use of AATCC gray scales for evaluating color change and staining) Grade 5-negligible or no color change or staining/color transfer Grade 4-slight to negligible color change or staining/color transfer Grade 3-noticeable color change or staining/color transfer Grade 2-considerable color change or staining/color transfer Grade 1-much color change or staining/color transfer | 4.0 | 3.0 | Both Fabrics were tested using a Xenon light source. Colorfastness for the invention is within an acceptable range, according to most industry standards. The conventional fabric is on the lower end and would typically need to be re-evaluated |
| Bursting strength of textile fabrics Diaphragm bursting strength test method (hydraulic) ASTM Delta 3786 Delta 3786 Mike 13 new line average Papa Sierra India | 116.4 | 117 | Both fabrics were placed in a hydraulic diaphragm bursting tester which stretches fabric to ensure overall strength (i.e., make sure fabric doesn't rip/burst). Both Fabrics have excellent bursting strength properties and are considered strong fabrics. There is a negligible difference between the invention and the conventional fabrics |
| Pilling resistance and other related surface changes of textile Fabrics random tumble pilling ASTM 3512/D 3512M-16. After 30 minutes (average) Pilling Key to grade rating 5-no peeling or fuzziness 4-slight pilling or fuzziness 3-moderate peeling or fussiness 2-severe peeling or fuzziness 1-very severe peeling or fuzziness | 5.0 | 5.0 | Using the random tumble pilling tester, both fabric pilling resistance results are excellent. There is no difference between the invention and the conventional fabric |
| Pilling resistance and other related surface changes of textile Fabrics random tumble pilling ASTM 3512/D 3512M-16. After 30 minutes (average) Fuzzing Key to grade rating 5-no peeling or fuzziness 4-slight pilling or fuzziness 3-moderate peeling or fussiness 2-severe peeling or fuzziness 1-very severe peeling or fuzziness | 5.0 | 5.0 | Using the random tumble pilling tester, both fabrics fuzzing resistance results are excellent there is no difference between the invention and the conventional fabric |
| Stretch properties of knitted Fabrics having low power ASTM D 2594-04 (2012) loose-fitting (comfort stretch) after static extension (2 hours) and relaxation (1 hour) Wale average (%)growth | 0.00 | 0.00 | This test method covers the measurement of fabric stretch and fabric growth of knitted fabrics intended for applications requiring low power stretch properties. Both fabrics showed no growth percentage in wale direction leading to an excellent result. There is no difference between the invention and the conventional materials |

TABLE 7-continued

Examples of Textile Properties With and Without Masterbatch

| Test Type | Fabric With Invention | Fabric Without Invention | Explanation Of Test Results |
| --- | --- | --- | --- |
| Stretch properties of knitted Fabrics having low power ASTM D 2594-04 (2012) loose-fitting (comfort stretch) after static extension (2 hours) and relaxation (1 hour) Wale average (%) recovery | 100 | 100 | This test method covers the measurement of fabric stretch and fabric growth of knitted fabrics intended for applications requiring low power stretch properties. Both fabrics showed 100% recovery in wale direction leading to an excellent result. There is no difference between the invention and conventional fabrics |
| Stretch properties of knitted Fabrics having low power ASTM D 2594-04 (2012) loose-fitting (comfort stretch) after static extension (2 hours) and relaxation (1 hour) Course average (%) growth | 2.1 | 1.3 | This test method covers the measurement of fabric stretch and fabric growth of knitted Fabrics intended for applications requiring low power stretch properties. Both fabrics showed very little growth percentage in course direction and is within an acceptable range. There is a negligible difference between the invention and conventional Fabrics |
| Stretch properties of knitted Fabrics having low power ASTM D 2594-04 (2012) loose-fitting (comfort stretch) after static extension (2 hours) and relaxation (1 hour) course average (%) recovery | 93.1 | 95.8 | This test method covers the measurement of fabric stretch and fabric growth of knitted Fabrics intended for applications requiring low power stretch properties. Both fabrics showed excellent recovery percentages in course direction and with is within an acceptable range. There is a negligible difference between the invention and the conventional Fabrics |
| Vertical wicking of textiles AATCC 197-2013 option B original state Water wicking distance in 2 minutes-short period wicking rate Lengthwise (average) | 21 mm 0.17 mm/s | 20 mm 0.34 mm/s | This test method is used to evaluate the ability of vertically aligned fabric specimens to transport liquid along air through them both fabric showed excellent wicking capabilities and is within an acceptable range. There is a negligible difference between the invention and the conventional fabrics. |
| Vertical wicking of textiles AATCC 197-2013 option B original state Water wicking distance in 10 minutes-long period wicking rate Lengthwise (average) | 72 mm 0.12 mm/s | 73 mm 0.12 mm/s | This test method is used to evaluate the ability of vertically aligned fabric specimens to transport liquid along air through them both fabric showed excellent wicking capabilities and is within an acceptable range. There is a negligible difference between the invention and the conventional fabrics |
| Vertical wicking of textiles AATCC 197-2013 option B original state Water wicking distance in 30 minutes-long period wicking rate Lengthwise (average) | 146 mm 0.08 mm/s | 146 mm 0.08 mm/s | This test method is used to evaluate the ability of vertically aligned fabric specimens to transport liquid along air through them both fabric showed excellent wicking capabilities and is within an acceptable range. There is a negligible difference between the invention and the conventional fabrics. |
| Vertical wicking of textiles AATCC 197-2013 option B original state Water wicking distance in 2 minutes-short period wicking rate Widthwise (average) | 18 mm 0.15 mm/s | 17 mm 0.29 mm/s | This test method is used to evaluate the ability of vertically aligned fabric specimens to transport liquid along air through them both fabric showed excellent wicking capabilities and is within an acceptable range. There is a no difference between the invention and the conventional fabrics |
| Vertical wicking of textiles AATCC 197-2013 option B original state Water wicking distance in 10 minutes-long period wicking rate Widthwise (average) | 70 mm 0.12 mm/s | 69 mm 0.12 mm/s | This test method is used to evaluate the ability of vertically aligned fabric specimens to transport liquid along air through them both fabric showed excellent wicking capabilities and is within an acceptable range. There is a negligible difference between the invention and the conventional fabrics |
| Vertical wicking of textiles AATCC 197-2013 option B original state Water wicking distance in 30 minutes-long period wicking rate Widthwise (average) | 139 mm 0.08 mm/s | 139 mm 0.08 mm/s | This test method is used to evaluate the ability of vertically aligned fabric specimens to transport liquid along air through them both fabric showed excellent wicking capabilities and is within an acceptable range. There is a no difference between the invention and the conventional Fabrics |

Microscopic Analysis of Fibers Subjected to Bacterial Decomposition

Figure 6:
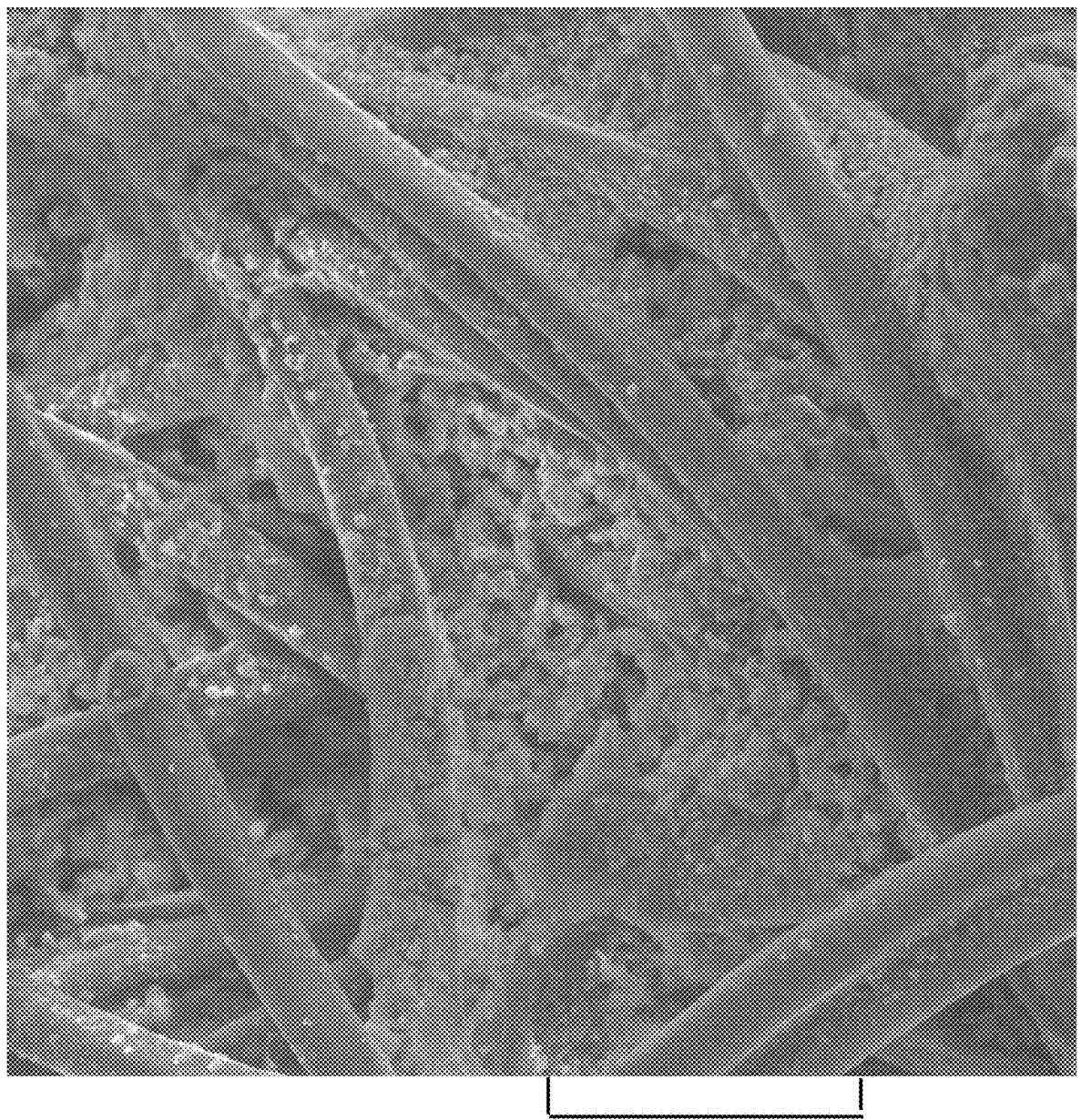
FIG. 6 is an SEM micrograph of partially digested fibers according to the invention.

Electron microscopic imaging of fibers subjected to bacterial decomposition of fibers according to the invention in ASTM D5511 are shown in the SEM image of FIG. 6 (SEM HV: 15 kV; view field 173 microns; SEM magnification 1.5; Tescan™ Vega 3™ tungsten thermionic emission SEM system (https://www.tescan.com/en-us/technology/sem/vega3); accessed Feb. 12, 2019), and show bacterial colonization on the surface of polyester greige fibers according to the invention, after >1 year exposure to bacteria.

In the drawings and specification there has been set forth a preferred embodiment of the invention, and although specific terms have been employed, they are used in a generic and descriptive sense only and not for purposes of limitation, the scope of the invention being defined in the claims.

The invention claimed is:

1. A biodegradable fiber comprising:
between 0.009 and 0.011 mass percent calcium carbonate;
polycaprolactone in an amount of 0.39-0.49 mass percent; and
with the remainder being polyethylene terephthalate.

2. The fiber of claim 1 that, when subjected to the conditions of ASTM D5511 for 266 days, decomposes at least 40%.

3. The fiber of claim 1 that, when subjected to the conditions of ASTM D5511 for 266 days, decomposes at least 50%.

4. The fiber of claim 1 that, when subjected to the conditions of ASTM D5511 for 266 days, decomposes between 40% to 80%.

5. The fiber of claim 1 that, when subjected to the conditions of ASTM D5511 for 266 days, decomposes between 40% to 75%.

6. The fiber of any one of claims 2 to 5, wherein the decomposition products from the ASTM testing are primarily methane and carbon dioxide.

7. The fiber of any one of claims 1 to 6, having a dimensional stability such that the textile maintains its shape and shrinks by less than 10%, or less than 5%, or less than 3%, when subjected to the conditions of Home Laundering Test 20 AATCC 135-2015 1IIAii (machine wash at 80 F, tumble dry, five laundering cycles).

8. A dyed fiber according to any one of claims 1 to 7, having a colorfastness of at least Grade 3 when subjected to the conditions of AATCC 61-2013 2A (mod 105 F) or AATCC 8-2016, or AATCC 16.3-2014 (Option 3, 20 AFU).

9. A dyed fiber according to any one of claims 1 to 7, having a colorfastness of at least Grade 4 when subjected to the conditions of AATCC 61-2013 2A (mod 105 F) or AATCC 8-2016, or AATCC 16.3-2014 (Option 3, 20 AFU).

10. A dyed fiber according to any one of claims 1 to 7, having a colorfastness of Grade 5 when subjected to the conditions of AATCC 61-2013 2A (mod 105 F) or AATCC 8-2016, or AATCC 16.3-2014 (Option 3, 20 AFU).

11. The fiber of any one of claims 1 to 10, having a bursting strength of at least 20 psi (about 138 kpa), when subjected to the conditions of ASTM D3786/D3886M-13.

12. The fiber of any one of claims 1 to 10, having a bursting strength of at least 50 psi (about 345 kpa), when subjected to the conditions of ASTM D3786/D3886M-13.

13. The fiber of any one of claims 1 to 10, having a bursting strength of at least 100 psi (about 689 kpa), when subjected to the conditions of ASTM D3786/D3886M-13.

14. The fiber of any one of claims 1 to 10, having a bursting strength, in the range of 25 to 200 psi (about 172 to about 1379 kpa) when subjected to the conditions of ASTM D3786/D3886M-13.

15. The fiber of any one of claims 1 to 10, having a bursting strength, in the range of 50 to about 150 psi (about 345 to about 1304 kpa) when subjected to the conditions of ASTM D3786/D3886M-13.

16. The fiber of any one of claims 1 to 15, having a wicking ability such that when subjected to the conditions of AATCC 197-2013 (Option B), the textile wicks water over a distance of at least 10 mm in 2 minutes.

17. The fiber of any one of claims 1 to 15, having a wicking ability such that when subjected to the conditions of AATCC 197-2013 (Option B), the textile wicks water over a distance of at least 20 mm in 2 minutes.

18. The fiber of any one of claims 1 to 15, having a wicking ability such that when subjected to the conditions of AATCC 197-2013 (Option B), the textile wicks water over a distance in the range of about 10 mm to about 150 mm in 2 minutes.

19. The fiber of any one of claims 1 to 15, having a wicking ability such that when subjected to the conditions of AATCC 197-2013 (Option B), the textile wicks water over a distance of in the range of about 20 mm to about 150 mm in 2 minutes.

20. The fiber of any one of claims 1 to 19, further comprising polybutylene succinate in an amount of 9-11 mass percent.

21. The fiber of any one of claims 1 to 20, further comprising a composition selected from the group consisting of 0.05-0.1% weight PLA, 0.05-0.1% weight PHA, 0.05-0.1% weight PBAT, 0.10-0.20% weight PBS, 0.01% weight silicon dioxide, and combinations of these compositions.

22. A textured fiber according to any one of claims 1 to 21.

23. A yarn formed from the textured fiber of claim 22.

24. A fabric formed from the yarn of claim 23.

25. A fabric according to claim 24 selected from the group consisting of woven, nonwoven, and knitted fabrics.

26. A dyed fabric according to claim 25.

* * * * *